(12) United States Patent
König et al.

(10) Patent No.: US 10,295,353 B2
(45) Date of Patent: May 21, 2019

(54) METHODS AND SYSTEMS FOR OBTAINING A MULTI-MODAL ROUTE

(71) Applicants: TOMTOM DEVELOPMENT GERMANY GMBH, Leipzig (DE); TOMTOM INTERNATIONAL B.V., Amsterdam (NL)

(72) Inventors: Felix Godafoss König, Berlin (DE); Thomas Gerhard Helmut Schickinger, Berlin (DE); Leon van Helvoort, Breda (NL); Heiko Schilling, Birmingham (GB)

(73) Assignee: TOMTOM NAVIGATION B.V., Amsterdam (NL)

( * ) Notice: Subject to any disclaimer, the term of this patent is extended or adjusted under 35 U.S.C. 154(b) by 360 days.

(21) Appl. No.: 14/912,654

(22) PCT Filed: Aug. 11, 2014

(86) PCT No.: PCT/EP2014/067186
§ 371 (c)(1),
(2) Date: Feb. 18, 2016

(87) PCT Pub. No.: WO2015/024807
PCT Pub. Date: Feb. 26, 2015

(65) Prior Publication Data
US 2016/0202079 A1  Jul. 14, 2016

(30) Foreign Application Priority Data
Aug. 19, 2013  (GB) .................................. 1314824.2

(51) Int. Cl.
*G01C 21/34*  (2006.01)
*G08G 1/0968*  (2006.01)

(52) U.S. Cl.
CPC ...... *G01C 21/3423* (2013.01); *G08G 1/096833* (2013.01)

(58) Field of Classification Search
None
See application file for complete search history.

(56) References Cited

U.S. PATENT DOCUMENTS

| 8,779,941 B2 * | 7/2014 | Amir .................. G01C 21/3685 340/932.2 |
| 2008/0059061 A1 | 3/2008 | Lee |

(Continued)

FOREIGN PATENT DOCUMENTS

| CN | 1313504 | 9/2001 |
| CN | 101253388 | 8/2008 |

(Continued)

OTHER PUBLICATIONS

ISR for PCT Application No. PCT/EP2014/067186 dated Oct. 30, 2014.

*Primary Examiner* — Rami Khatib
*Assistant Examiner* — Gerrad A Foster

(57) ABSTRACT

A method of performing routing in relation to a multi-modal transportation network involves representing a multi-modal transportation network using a plurality of segments, each being indicative of a navigable segment of the network, and each segment having data representative of a traversal time for the segment associated therewith. The plurality of segments of the multi-modal transportation network includes a first subset of segments indicative of a public transport network, and a second subset of segments indicative of a road network which may be joined, left and traveled through by a user substantially freely at any time. The traversal time data associated with segments of the public transport network associated with interchange points with the road network is based on a transit time indicative of a time taken (Continued)

to travel along the segment, and an additional waiting time. A route search is performed between an origin and a destination within the multi-modal transportation network using the traversal time data associated with the segments of the network in order to obtain one or more multi-modal route through the transportation network.

20 Claims, 7 Drawing Sheets

(56) References Cited

U.S. PATENT DOCUMENTS

| | | | |
|---|---|---|---|
| 2012/0022904 A1* | 1/2012 | Mason | G01C 21/3469 705/7.13 |
| 2012/0310520 A1 | 12/2012 | Kanno et al. | |
| 2013/0179067 A1 | 7/2013 | Trowbridge et al. | |

FOREIGN PATENT DOCUMENTS

| | | |
|---|---|---|
| CN | 102818574 | 12/2012 |
| CN | 102939623 | 2/2013 |
| CN | 103221781 | 7/2013 |
| JP | 2004117031 | 4/2004 |
| JP | 2006193020 A | 7/2006 |
| JP | 2008064615 | 3/2008 |
| JP | 2009103657 | 8/2008 |
| JP | 2009137498 | 6/2009 |
| JP | 2012189438 | 10/2012 |
| JP | 2012251938 | 12/2012 |

\* cited by examiner

METHODS AND SYSTEMS FOR OBTAINING A MULTI-MODAL ROUTE

CROSS-REFERENCES TO RELATED APPLICATIONS

The present application is the National Stage of International Application No. PCT/EP2014/067186, filed Aug. 11, 2014 and designating the United States, which claims benefit to United Kingdom Patent Application 1314824.2 filed on Aug. 19, 2013. The entire content of these applications are incorporated herein by reference.

FIELD OF THE INVENTION

The present invention relates to methods and systems for obtaining a multi-modal route through a multi-modal transportation network. The multi-modal transportation network is a network which permits travel by more than one mode of transport. More specifically, the present invention relates to performing routing in relation to a multi-modal network including sub-networks of different types. The multi-modal network includes a first transportation sub-network which may be joined, left and traveled through only at specific times, such a public transportation network, and a second transportation sub-network which may be joined, left and traveled through freely by a user at any time, such as a network for use by private transport, e.g. a road network.

BACKGROUND TO THE INVENTION

Obtaining a multi-modal route through a multi-modal transportation network presents certain challenges. Such transportation networks typically include sub-networks of different types, i.e. associated with different modes of transport. These differences in the properties of the different types of network make it difficult to generate a multi-modal route across both types of network, as a routing engine cannot easily operate on both types of network. Routing algorithms tend to be specific to a certain type of transportation network. Current attempts to obtain a multi-modal route involve exploring the different networks separately to determine routes therethrough. For example, a route may be determined from a departure point through a network associated with one mode of transport to a departure point for another mode of transport, and then a route from the departure point for the other mode of transport to the destination determined through a network associated with the other mode of transport.

By way of example, a multi-modal transportation network may include a public transportation sub-network, and a transportation sub-network for use by private transport, e.g. a road network (a "private transportation sub-network" as referred to herein). These types of network have different properties. Times of entry, exit and travel through a public transportation network are constrained, such that entry, exit and travel through the network may only occur at specific times, i.e. in accordance with a schedule associated with the network. In contrast, such constraints do not exist in relation to a private transportation network, such as a road network, when using private transport. In a private transportation network, a user may choose to enter, exit or travel through the network freely, at a time of their choosing.

Private transport routing algorithms, e.g. car routing algorithms, and public transportation routing algorithms tend to differ mathematically as a result of the different properties of such networks, with the consequence that they cannot readily be integrated to provide a true multi-modal route planner. Previous attempts to obtain a multi-modal route involving both road and public transport networks have tended to involve using a first routing algorithm to find a route through the road network from an origin to a closest point of interchange with the public transport network, and then using a second route planner for the public transport network to find a route from the interchange to a destination. There is increasing interest in being able to generate multi-modal routes, e.g. to allow a user to integrate their use of private transport and public transport between an origin and destination of interest, to provide a more efficient overall journey, and/or to reduce environmental impact.

The Applicant has realised that there is a need for improved methods and systems for generating routes through a multi-modal transportation network, in particular where the network includes a first sub-network where times of entry, exit and travel through the network are constrained, such as a public transportation network, and a second sub-network which is not so constrained, such as a road network.

SUMMARY OF THE INVENTION

In accordance with a first aspect of the invention there is provided a method of performing routing in a multi-modal transportation network represented using a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multi-modal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs, the method comprising:

performing a route search between an origin and a destination within the multi-modal transportation network using the traversal time data associated with the segments of the network in order to obtain one or more possible multi-modal route from the origin to the destination through the transportation network.

The method may extend to the step of representing the multi-modal network using the plurality of segments, each being indicative of a navigable segment of the network, and each segment having data indicative of a traversal time for the segment associated therewith, as set out above.

Further, and in accordance with a second aspect of the present invention, there is provided a system arranged to perform routing in a multi-modal transportation network represented by a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multi-modal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs, the system comprising:

means for performing a route search between an origin and a destination within the multi-modal transportation network using the traversal time data associated with the segments of the network in order to obtain one or more possible multi-modal route from the origin to the destination through the transportation network.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of the segments of the multi-modal transportation network, and the associated traversal time data.

The present invention thus relates to methods and systems for performing routing in relation to a multi-modal transportation network. A multi-modal transportation network as used herein refers to a transportation network which through which travel may occur via two or more different modes of transport. Modes of transportation may include, but are not limited to, boat, car, train, tram, plane, cycle, foot, car-pooling, coach, or bus. Boats as referred to herein may encompass any type of boat, such as a ferry, canal boat, river-bus, etc. Trains as referred to herein include any type of train, such as underground train, rapid transit, intercity trains etc. The term "cycle" may include motorised or non-motorised cycles, and hybrid type cycles.

In accordance with the invention, each segment representative of a navigable segment of the multi-modal transportation network is associated with data indicative of a traversal time for the segment. Certain of the segments are associated with a traversal time that is based on both a transit time to traverse the segment, and an additional time based on a frequency at which travel along the segment may occur. These segments are at least some of the segments indicative of a first transportation sub-network of the multi-modal network which permits a user to join, leave and travel through the network only at specific times. The specific times may be scheduled times, e.g. in accordance with a timetable. These are features typically associated with public transport networks. In preferred embodiments the first transportation sub-network is a public transportation network. Of course, it will be appreciated that the invention is also applicable to situations in which the transportation sub-network is of a different type, constrained as to times of entry and exit to the network, and travel therethrough. The first transportation sub-network may be at least a portion of a public transportation network in the applicable area that forms part of the multi-modal transport network.

The first transportation sub-network permits travel via one or more modes of transportation. In preferred embodiments in which the first transportation sub-network is a public transport network, the network may permit travel by any one or ones of: bus, tram, coach, train, boat, and plane. For example, the network may be an integrated public transport network permitting travel by more than one of these modes, e.g. bus, train, boat and/or tram. However, in some embodiments the first transportation sub-network permits travel via only a single mode of transportation. The first transportation sub-network is associated with one or more modes of transportation which enable it to only be joined, left and traveled through at specific times. The first transportation sub-network may be defined by segments extending between nodes of the network. The nodes may correspond to stations or stops of the network.

In accordance with the invention, the multi-modal transportation network includes a first transportation sub-network and a second transportation sub-network. The first and second transportation sub-networks are of different types, i.e. they permit different types of travel. This is as a result of the type of the network and the mode(s) of transport with which it is associated. The first and second transportation sub-networks are preferably associated with different modes of transportation. The first and second transportation sub-networks each permit travel via one or more modes of transportation, preferably wherein at least one, and optionally each of the modes of transportation permitted via the first transportation sub-network is different to a mode of transportation permitted via the second transportation sub-network. In some embodiments the first transportation sub-network does not permit travel by the or each mode of travel permitted by the second transportation sub-network and vice versa.

The second transportation sub-network is a network which may be joined, left and traveled through by a user substantially at any time. The second sub-network is associated with one or more modes of travel which enable the network to be joined, left and traveled through by a user essentially freely. Thus, times of entry, exit and travel through the network are not subject to constraint. By this it is meant that a user is generally free to enter, leave or travel through the sub-network at will. While the user might experience some minor restrictions to entering, leaving or travel through the sub-network imposed by traffic controls, such as traffic lights, etc, the user is generally free to travel at a time of their choosing. This is by contrast to the first transportation sub-network. The times of entry, exit and travel through the second transportation sub-network are not constrained by a schedule, e.g. timetable. The network is preferably a transportation network for use by private transport (a "private transportation network" as referred to herein), such as a road network. The network is preferably a network that permits travel by one or more modes including car, cycle, and foot. The second transportation subnetwork may permit travel via only one mode of transport. The network may be a network permitting travel by private vehicle, e.g. car, van, lorry, bicycle, motorbike, etc. Private transport refers to transport which permits a user to travel at a time of their choosing. This includes hired vehicles or other forms of transport, which are not subject to scheduling constraints. For ease of reference herein, the second transportation sub-network may be referred to as a private transport or private vehicle network, such as a road network, and to travel through the road network being by vehicle or car. However, it will be understood that this is merely exemplary, and the sub-network may be any such network which permits a user to freely enter, exit and travel through the network, e.g. a walking network, cycle network, etc. References to the mode of transport being by car or vehicle should also be understood as being merely exemplary. For example, the mode of transport may be by foot, bicycle, motorcycle, etc. In embodiments in which the network is a road network, travel may be by any form of vehicle permitted to travel along a road, e.g. motorbike, car, van, lorry, etc. The second transportation sub-network may be at least a portion of a private transportation network in the applicable area that forms part of the multi-modal transport network.

The multi-modal transportation network comprises the first and second transportation sub-networks. The multi-modal transportation network may consist of these networks, or may comprise one or more additional segments, e.g. forming one or more additional transportation sub-network. For example, the network may include one or more additional public transportation network, e.g. permitting travel via a different mode or modes. The multi-modal transportation network is the global transportation network provided by the combination of at least the first and second transportation sub-networks.

The multi-modal transportation network includes one or more points at which interchange is possible between the first transportation sub-network and the second transportation sub-network, i.e. between different modes of transport. These may correspond to nodes of the first transportation sub-network, e.g. stations. A point of interchange between the sub-networks may be referred to as a transit point. The data representing the multi-modal transportation network may comprise data representative of the one or more interchange points. An interchange point may be represented by a node of the multi-modal transportation network having at least one incoming or outgoing segment on the first transportation sub-network and at least one incoming or outgoing segment on the second transportation sub-network.

The plurality of segments used to represent the multi-modal transportation network each represent respective segments of the network, i.e. segments in reality. The term "segment" has its usual meaning in the art, referring to an arc extending between nodes of the network. The segments may be represented using electronic map data. Preferably each navigable segment is associated with data indicative of the sub-network of the multi-modal transportation network to which it belongs. Each segment is additionally associated with the traversal time data for the segment. A segment may also be associated with any additional information relating to properties thereof.

In accordance with the present invention, each segment of the multi-modal transportation network is associated with data indicative of a traversal time for the segment. The data may be indicative in any manner of the traversal time. As will be described in more detail below, the traversal time data for at least some of the segments forming part of the first transportation sub-network is based on an additional time component based upon a frequency with which travel may occur along the segment through the first transportation sub-network. However, although the traversal time data for these segments is based on an additional time component, the traversal time data is indicative of an overall traversal time, in the same way as the traversal time data associated with other segments which is not based on the additional time component. The traversal time data associated with any of the segments of multi-modal network may therefore be treated in the same manner by a routing engine. The routing engine will operate using the overall traversal time data associated with a segment, however it might have been derived. The present invention recognises that by adjusting the traversal time data for segments forming part of the transportation sub-network in which travel is subject to time constraints, i.e. to include an additional time penalty, the segments may be provided with an appropriate overall traversal time data which enables them to be considered together with segments of the second transportation sub-network when determining a route through the multi-modal transportation network, but such that they may be penalised as appropriate depending upon a frequency with which travel along the segment is permitted. Lower frequencies will tend to correlate to longer expected waiting times for the segments. Associating such segments with greater additional time penalties (indicative of longer expected waiting times) may result in the segments being treated less favourably by a routing engine, as is the case with conventional road routing applications. As the penalty is incorporated in the traversal time data associated with a segment of the sub-network, a routing engine may operate in accordance with any conventional technique to determine a route based on traversal time, taking into account segments of the different types of sub-network which make up the multi-modal network, and does not need to have access to detailed scheduling information for the first sub-network. A routing engine need not distinguish between the segments of the different sub-networks making up the multi-modal network. This enables true multi-modal routing to be performed, with the ability for a routing engine to explore all segments of the multi-modal network together. This may be performed without needing to modify a conventional routing engine that determines a route based upon traversal times associated with segments of a network, such as a car routing engine.

At least some of the segments indicative of the first transportation sub-network are associated with the traversal time data based on an additional frequency-based time. Only a subset of the segments indicative of the first transportation sub-network may be associated with the traversal time data based on the additional frequency-based time. The segments (e.g. the segments of the subset) preferably include or are those segments of the sub-network associated with, e.g. extending from, a point of interchange with the second transportation sub-network, e.g. with a segment of the second transportation sub-network. The segments may be incoming or outgoing segments at the point of interchange. A point of interchange may be referred to as a transit point between the first and second sub-networks. A point of interchange may correspond to a node, e.g. station of the first transportation sub-network. Thus a segment of the first transportation sub-network associated with a point of interchange may be an incoming or outgoing segment of the first transportation sub-network at a node, which node also has an incoming or outgoing segment that is part of the second transportation sub-network. This enables the frequency based component of the traversal time to be taken into account only for those segments where the user may be expected to wait for a service, i.e. when changing from the second sub-network.

As used herein, the transit time upon which a traversal time for a segment is based refers to the expected time taken to travel along the segment from one end to the other, i.e. a travel time for the segment. The transit time may be an approximation of the transit time for the segment. For example, variation according to times of day may be disregarded, or for segments of the first sub-network, precise timings according to a timetable or the exact service taken may be disregarded. The transit time data enables the one or more multi-modal routes through the transportation network to be obtained through a route search. However, as discussed below, once the route or routes have been obtained, more detailed timing data for the route may be obtained, e.g. by reference to data indicative of a schedule for the sub-network, such as accurate timetable data, possibly obtained from a third party route planner.

The frequency with which it is possible to travel along a segment of the first transportation sub-network may be defined by a schedule governing transportation along the segment. The frequency may be a frequency with which a transport service runs along the segment.

It will be appreciated that there may be services having different frequencies and/or transit times travelling along the same path within the first transportation sub-network. For example, when travelling from A to B, there may be a more frequent service stopping at various intermediate points C, D and E, or a less frequent express service, travelling non-stop from A to B. This may be accounted for in various manners. It is envisaged that the first sub-network may be represented using a plurality of sets of segments representative of different services. For example, in respect of the stopping service, there may be segments extending from A-C, C-D, D-E and E-B, each associated with a traversal time based upon the appropriate transit time, and for at least those segments associated with a point of interchange with the second sub-network, with a frequency for the stopping service. In respect of the express service, there may be a single segment extending from A to B (which may be defined as the group of segments extending from A-B), associated with a traversal time based upon the transit time from A to B and frequency of service when using the express service.

The traversal time associated with at least some of the segments of the first transportation sub-network is based on a transit time for the segment and an additional frequency-based time. This is because, as the ability to travel along the segment is constrained, e.g. by a schedule, in practice the time taken to travel along the segment as part of the route can be approximated by a sum of the transit time for the segment, i.e. time to travel from one end to the other, and an expected waiting time i.e. for a service along the segment, which will be dependent upon frequency. It has been found that the frequency with which travel is possible along a segment of the first sub-network, i.e. a service frequency may be used to provide an approximation of waiting time. For example, if the service frequency is 5 times an hour, it can be assumed that there will be a service every 12 minutes. This may be used to provide an approximate waiting time. For example, in a simple situation, the interval between services may simply be halved to give an approximation of average waiting time. For the example of a service frequency of 5 times per hour, it may be assumed that there is an average waiting time of 6 minutes, to try to capture the variation in waiting time that might be experienced in practice, depending upon exact arrival time. Of course more complicated methods may be used to estimate a waiting time based upon frequency. However, it has been found that only an approximate indication of frequency is required to enable one or more multi-modal routes may be obtained. As discussed in more detail below, once a short list of possible routes has been obtained, individual routes may be considered in more detail, e.g. using a route planner that is designed for use only with the first transportation network, and utilises data indicative of a schedule for the first transportation sub-network, to obtain exact frequencies of service.

Preferably therefore the additional time based on a frequency at which travel along the segment may occur is indicative of an expected waiting time. The expected waiting time is an expected waiting before travel along the segment may commence. This may be a waiting time for a service along the segment, e.g. at an interchange with the second network associated with the segment. Preferably the expected waiting time is obtained based on a reciprocal of the frequency at which travel along the segment may occur.

In embodiments the traversal time associated with segments of the first transportation sub-network associated with, e.g. extending from, points of interchange with segments of the second sub-network of the multi-modal network are associated with the traversal time including the additional frequency-based time. This enables routes through the multi-modal network to be more easily explored by reference to traversal time for the routes. The traversal time for routes including an interchange between sub-networks may more appropriately reflect actual traversal time for the route, by taking into account an expected waiting time at the interchange.

It is envisaged that the traversal time for a segment may be time dependent. In cases in which the traversal time is based on a transit time for the segment and an additional time based on frequency with which travel along the segment is possible, the time dependence may result from a time dependence of one or both of the transit time and the additional time based on frequency. At least the additional time based upon frequency may be time dependent. This is because the frequency with which travel is possible along a segment may change throughout the day, e.g. there may be more frequent services at busier times of day. Traversal times for other segments of the multi-modal network, e.g. associated with the second sub-network thereof, such as a road network may also be time dependent. This may enable variation in expected traversal time throughout the day as a result of changing traffic conditions to be accounted for. This may be similar to techniques used in conventional route planning methods, i.e. in respect of a single mode of transport, such as route planning through a road network, where time dependent traversal times may be used. In any embodiment in which a traversal time is time dependent, the time may be dependent upon time of day and/or day of the week. The or each segment associated with time dependent transversal time data may be associated with a plurality of traversal times in respect of different time periods, e.g. times of day and/or days of the week. An appropriate traversal time may then be selected for use in the route generation process based upon a current time, or a time at which travel is expected to occur. However, as it has been found that the one or more multi-modal routes may be generated based upon traversal time data that is approximate in nature, with more detailed consideration of the limited number of routes found then being carried out, e.g. by reference to data indicative of a schedule for the transportation sub-network, (such as using a third party route planner), it is not necessary that precise traversal time date be associated with the segments, at least for segments of the first sub-network, and it is only optional that the data is time dependent.

Each segment of the multi-modal network is associated with a traversal time. However not every segment is associated with a traversal time that is based at least in part on an additional time based upon frequency at which travel is possible along the segment. In embodiments only the at least some segments of the first transportation sub-network are associated with a traversal time that is based at least in part on the additional time, e.g. those segments extending from points of interchange with the second sub-network. In embodiments at least some of the segments of the first transportation sub-network are not associated with a traversal time that is based at least in part on the additional time based on frequency, e.g. those segments which do not extend from points of interchange with the second sub-network. In embodiments segments of the multi-modal network which do not form part of the first transportation sub-network are not associated with a traversal time that is based at least in part on the additional time based on frequency. Such segments may be or include segments of the second transportation sub-network of the multi-modal network. In embodiments the segments of the second sub-network of the multi-modal network are not associated with a traversal time that is based at least in part on the additional time based on frequency. Those segments (of whichever sub-network) which are not associated with a traversal time that is based on transit time and an additional frequency based time may be associated with a traversal time that is based on transit time, and preferably only transit time. Preferably the segments of the second sub-network are associated with a traversal time based upon transit time, and preferably based only upon transit time.

A traversal time based upon transit time may be determined in any manner known in the art. For segments of the second sub-network through which travel may occur substantially freely, e.g. a private or road network, the traversal time may be an attribute of the segment associated with the digital map data indicative of the segment. It is customary for segments of a road network to be associated with traversal time data in the form of transit time data to enable route generation to be performed. For segments of the first transportation sub-network, a traversal time based upon transit time (whether used alone or together with an additional frequency-based component) for the segment may be obtained as described above based upon an expected travel time along the segment. This may be an approximation of the expected travel time, e.g. not taking into account precise timings according to a timetable.

In accordance with the invention a route search is performed between an origin and a destination within the multi-modal transportation network using the traversal time data associated with the segments of the network in order to obtain one or more multi-modal route through the transportation network. This step may be carried out using any route search algorithm known in the art, such as one for use with planning car routes through a road network, e.g. a shortest path search algorithm based on Dijkstra's algorithm. Such search algorithms typically take into account at least a traversal time associated with segments of the road network, and optionally other factors. By associating traversal time data with each of the segments of the multi-modal network, regardless of the type of sub-network to which they belong, the segments may be treated in the same way, and a route obtained in the same manner as through a conventional single mode transportation network, such as a road network. The route algorithm will simply look at the overall traversal time associated with a segment, regardless of whether it is based upon an additional frequency based time or not. The route search takes into account traversal time data associated with those segments that are considered for the purposes of routing. Such segments may be a subset of the segments of the multi-modal network e.g. based upon the origin and/or destination.

The method extends to the step of representing the segments of the multi-modal network as described herein, such that the segments are associated with traversal time data. This may be achieved by accessing appropriate data. The method also extends to the step of creating the data representing the multi-modal network. The traversal time data may be obtained in any suitable manner. The traversal time data for segments of the first sub-network may be obtained from third party sources, the owners or operators of the public transport networks. The data for segments of the second sub-network may be obtained from digital map data used for route planning.

The origin and destination may be obtained in any suitable manner. In some embodiments the origin and/or destination are input by a user. In other embodiments one or both of the origin and destination may be inferred by a system. For example, this may be carried out by reference to a current position of a user and/or routes frequently traveled.

In some preferred embodiments the route search takes into account one or more interchange point preferences. These are taken into account in addition to the traversal time data. As each route that is obtained in the route search is a multi-modal route, it will comprise at least one interchange point between the first and second transportation sub-networks. An interchange point preference is preferably a user preference, and may be input by a user. A preference may be input by a user in relation to a particular route search, e.g. with an origin and destination, or may be a preset preference that is set in advance by a user and then used for any route search that is performed. An interchange point preference may be indicative of a preference relating to a type of interchange point, location of the interchange point, property of the interchange point, etc. Any combination of such preferences may be used. For example, a preference may specify that an interchange point is within a given distance of the origin, destination or home of the user, and/or that the interchange point has parking provision. In this way, by providing appropriate preferences regarding an interchange point, a user may try to obtain routes which involve changing from, for example, road to public transport networks closer to home, or alternatively closer to a destination, e.g. at the outskirts of a city.

It will be appreciated that a route searching algorithm may take into account such preferences in any suitable manner. For example, the algorithm may explore the multi-modal transportation network, and, when encountering an interchange point, i.e. node where there are incoming or outgoing segments belonging to both the first and second transportation sub-networks, determine whether the interchange point meets the criteria provided by the one or more preferences. If an interchange point is not in accordance with the preferences the algorithm may discontinue consideration of that route, and carry on exploring other routes. If the preferences are met, the algorithm may continue exploring the particular route including that interchange point. In other arrangements it is envisaged that one or more possible routes might be obtained and then checked to see whether the interchange points associated with the routes meet any interchange point preferences, with any routes which do not being disregarded.

In general, the method may comprise the step of receiving from a user one or more interchange point preferences. The preferences may be of any of the types described above. These may then be used in the route search, or after the route search to select a route from the possible routes obtained.

Preferably the traversal time data is used to provide a cost based on traversal time for each segment considered in the route search. The cost associated with each segment may be taken into account in obtaining a route through the network. Other factors in addition to traversal time may also be used in determining an overall cost for a segment. Preferably shorter traversal times are associated with a lower cost. It will be seen that those segments having traversal time based on the additional frequency related component will then be penalised relative to other segments without such an additional component (for the same transit time). In embodiments at least the penalty increases as the frequency decreases (and hence expected waiting time increases). The time based upon frequency thus provides a time penalty that is inversely proportional to frequency. The step of performing the route search using the traversal time data may comprise using the traversal time data in obtaining at least a fastest route through the network between the origin and destination. Alternatively or additionally, the method may comprise obtaining at least a least cost route through the network between the origin and destination. The least cost route will typically correspond to the fastest route, unless other route planning preferences are applied and given greater weight. In embodiments therefore, the fastest route may correspond to a least cost route through the network. The cost based on traversal time associated with a route through the network may be obtained by summing the traversal times associated with each segment of the network. In embodiments, where the segment is associated with an interchange between networks, the traversal time will take into account an approximate expected waiting time at the interchange by virtue of the additional time component included in the traversal time for the segment.

One or more possible multi-modal routes between the origin and destination are obtained as a result of the route search. Each route involves at least two modes of transport. Each route includes at least one segment of the first transportation sub-network, and at least one segment of the second transportation sub-network. Thus each route comprises a portion extending through the first transportation sub-network, and a portion extending through the second transportation sub-network. In preferred embodiments the origin is an origin within the second transportation sub-network, and the destination is a destination within the first transportation sub-network, although the reverse arrangement is also possible. In embodiments, therefore, the or each route is a route starting in the second transportation sub-network and ending in the first transportation sub-network. While only one possible multi-modal route may be obtained, e.g. a fastest route, in other preferred embodiments a plurality of multi-modal routes are obtained, e.g. a fastest route, and one or more next fastest routes. Preferably only a limited set of possible multi-modal routes is obtained. In some embodiments a set of from two to five multi-modal routes are obtained. The routes are preferably a set of fastest routes. Such routes may be obtained by ranking obtained routes according to traversal time. This may be done by reference to a duration of the routes and/or a time of arrival when following the routes as determined using the traversal time data associated with the segments of the multi-modal network. The traversal time data associated with segments of the multi-modal network enables the one or more possible routes through the network between the origin and destination to be obtained taking into account traversal time. However, as described above, the traversal time, in particular for segments of the sub-network that form part of the sub-network which may be joined, left and traveled through only at specific times, may be only an approximation of the actual traversal time. References to a route being a "fastest" route or similar, should be understood to refer to a route being the fastest route subject to any other constraints that may be imposed on the route search processes, e.g. preferences in relation to interchange points.

Preferably for the or each possible multi-modal route from the origin to the destination that is obtained, the method comprises obtaining data indicative of an interchange point along the route at which there is a change between the first and second transportation sub-networks, e.g. a change from the second transportation sub-network to the first. Preferably the or each route includes only one such interchange point. Identifying an interchange point between the networks is helpful, enabling more detailed route planning to be carried out in relation to the portion of the route through the first sub-network as discussed below. This may also be useful in selecting a recommended route or routes for a user. An interchange point for a route may be obtained as part of the route exploration process.

Once a number of possible multi-modal routes have been obtained, the method may comprise selecting a subset of one or more of the routes for recommendation to a user. A single recommended route may be selected.

In some embodiments the method may comprise selecting one or more recommended route from a plurality of possible multi-modal routes obtained using the data indicative of an interchange point identified in respect of each route. The method may comprise selecting the one or more recommended route by reference to one or more criteria relating to the interchange point, which may be user specified. The criteria may be that there is parking provision, and/or that the interchange point is within a predetermined distance of the origin, destination or a home of the user.

Alternatively or additionally, the method may comprise selecting one or more recommended route from a plurality of possible multi-modal routes obtained using more accurate traversal time data obtained for at least the portion of the route which extends through the first transportation sub-network. The recommended route may be a fastest route. However, where other preferences are taken into account, e.g. in relation to interchange point, the recommended route may be the optimum route taking into account these preferences and traversal time.

In any of its embodiments, whether or not a recommended route is obtained, the method preferably comprises obtaining data indicative of a more accurate traversal time for each possible multi-modal route obtained. The step of obtaining the data indicative of a more accurate traversal time for a route comprises obtaining data indicative of a more accurate traversal time at least for a portion of the route that extends through the first transportation sub-network. This may be used to verify that the route is suitable and/or to enable a recommended route with respect to traversal time to be identified. The data indicative of a more accurate traversal time may be in terms of an estimated time of arrival when following the route, or a duration of the route. Obtaining data indicative of the more accurate traversal time may involve obtaining more accurate data indicative of the transit time and/or time based upon frequency, e.g. expected waiting time for the portion of the route extending through the first sub-network. Preferably more accurate data indicative of at least the time based upon frequency e.g. expected waiting time is obtained.

In some embodiments the method comprises obtaining a plurality of possible multi-modal routes through the multi-modal transportation network between the origin and the destination using the traversal time data associated with segments of the network, wherein the traversal time data associated with the segments provides an approximation of the traversal times for the segments, and obtaining a more accurate traversal time for each of the plurality of possible multi-modal routes.

Determining a more accurate traversal time for a possible multi-modal route may involve obtaining a more accurate traversal time for at least a portion of the route defined by one or more segments which form part of the first transportation sub-network. This may be in terms of a duration of the route or an estimated time of arrival when following the route. The method may comprise obtaining a more accurate traversal time for the portion of the route based on a transit time of the route and an expected waiting time at an interchange point between the first transportation sub-network and the second sub-network of the multi-modal network. Determining a more accurate traversal time for a route may be carried out using (optionally third party) data indicative of a transport schedule for the transportation sub-network which may be joined, left and traveled through only at specific times, e.g. a route planner. Such data may provide an accurate waiting time at an interchange of the transportation sub-network and a more accurate transit time for the route. In these embodiments the present invention uses the traversal time data associated with segments of the multi-modal network, including those based at least in part upon frequency at which travel may occur along segments of the first sub-network to obtain a shortlist of possible routes, which may be fastest routes. In preferred embodiments (third party) schedule data is used to more accurately determine the traversal time for this limited list of routes, and hence select a recommended route, which may be an optimal route with respect to traversal time. Thus obtaining the initial shortlist of possible routes may be carried out by treating the multi-modal network as a single network, with separate consideration of the segments forming part of the first sub-network, and reference to accurate schedule data, e.g. obtained from third parties, being confined to the final evaluation of the possible routes. This is in contrast to prior art techniques, which would rely upon third party route planner data for a sub-network which may be joined, left and traveled through only at specific times to obtain any route at all through a multi-modal network including such a sub-network. In accordance with the invention in any of its embodiments, alternatively or additionally third party data may be used to obtain a more detailed itinerary for one or more of the possible routes. It will be appreciated that schedule data referred to herein, e.g. data indicative of a schedule for the first transportation sub-network, may be third party data, e.g. third party route planner data. The present invention provides the ability to avoid the need to rely upon third party data, at least in the route searching process to obtain the one or more possible multi-modal rotes.

In preferred embodiments as discussed above, the method comprises, for each possible route, obtaining data indicative of an interchange point at which there is an interchange between the first and second sub-networks (the "interchange data"). The method may comprise using the interchange data to obtain a more accurate traversal time for at least the part of the route through the first transportation sub-network. The more accurate traversal time data preferably comprises a more accurate transit time for travel along the part of the route, and a more accurate expected waiting time at the interchange point. The interchange data may be used to interrogate schedule data to provide the more accurate traversal time data. For example, data indicative of the interchange point and the destination may be used to interrogate schedule data to obtain more precise data regarding a traversal time for the portion of the route through the first sub-network, e.g. a duration and/or estimated time of arrival. Of course, depending upon whether the portion of the route through the first transportation sub-network occurs at the destination or origin end of the multi-modal route, or therebetween, the interchange data may be used together with the origin rather than the destination, or indeed data indicative of another interchange, to interrogate the schedule data.

Where the more accurate traversal time for a route is found to differ significantly from the approximate traversal time previously obtained, at least that possible route may be discarded. The route search process may be performed again in a manner to avoid that route. Thus determining a more accurate traversal time may enable inappropriate routes to be discarded.

Preferably the more accurate traversal time for each possible route is used to obtain one or more recommended route, e.g. for output to a user.

Preferably the or each possible route that is obtained includes only a single interchange point at which there is a change between the first and second sub-networks. In some preferred embodiments the multi-modal route comprises a first portion extending from an origin to the interchange point, and a second portion extending from the interchange point to the destination, wherein one of the first and second portions extends through the first transportation sub-network and the other of the first and second portions extends through the second transportation sub-network.

The method may comprise the step of outputting data indicative of at least one of the one or more possible multi-modal routes to a user. The or each route is preferably a recommended route. The step of outputting data indicative of at least one of the routes preferably comprises outputting data indicative of the interchange point of the route. Alternatively or additionally the method may comprise, for at least one of the one or more possible multi-modal routes generated, outputting data indicative of an itinerary for the route to a user. The method may comprise generating a set of navigation instructions indicative of at least a portion of the or each route which extends through the second sub-network, e.g. a road network. The method may comprise providing schedule data indicative of a schedule for the portion of the route which extends through the first sub-network to a user. The schedule data may be indicative of a proposed departure time and duration of travel along the portion of the route. Alternatively or additionally the method may comprise storing data indicative of the one or more possible multi-modal routes.

In accordance with the invention in any of its embodiments, the second sub-network is preferably a road network, and the portion of a route through the second sub-network is preferably a road route that is to be driven by a user. The interchange point is preferably a point at which a user is to transfer between car travel and public transport.

It will be appreciated that references to determining data indicative of a traversal time for a route may involve determining a transit time for the route or an estimated time of arrival e.g. based upon a time of departure, such as the current time, or a specified time.

In general, the system of the present invention in any of its embodiments may be at least one processing device. The or a processing device may be a device of a mobile device, such as a navigation device, whether a portable (or personal) navigation device (PND) or an integrated device, or may be a device of a server.

The method of the present invention may be implemented by a server or by a client device e.g. a navigation device. However, it will be appreciated that while the methods may be carried out by a device having navigation functionality, the methods may also be carried out by any suitable system having route generating capability, but not necessarily navigation functionality. For example, the methods may be implemented by a computer system, e.g. a desktop or laptop system, which does not have navigation functionality. A user may be presented with one or more multi-modal route which may then be printed or otherwise used to aid route selection at a subsequent time, or, for example, the routes may be stored for future use, e.g. downloading to a navigation device. In some embodiments the method of the present invention in any of its aspects or embodiments is carried out using a navigation device, and the present invention extends to a navigation device arranged to carry out the steps of the method of any of the aspects or embodiments of the invention. The navigation device may be a PND or an integrated, e.g. in-vehicle, device. The device is preferably a device associated with a vehicle. In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a system, e.g. processing device of a navigation device.

In embodiments in which data indicative of at least one of the obtained multi-modal routes is output to a user, this may be carried out, at least in part, by a navigation device associated with a vehicle of the user. The navigation device may output data indicative of at least a portion of the route through the second sub-network. Alternatively or additionally the method may comprise the step of transmitting data indicative of an interchange point along the route and an origin or destination of the route to a third party to enable third party schedule data indicative of a portion of the route extending between the interchange point and the origin or destination through the first sub-network to be provided to the user, e.g. via a mobile device of the user.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system, e.g. processing device of a server.

Of course, the steps of the method of the present invention in any of its aspects or embodiments may be carried out in part by a server and in part by a client apparatus e.g. navigation apparatus or other mobile apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Thus, the system of the present invention may be provided in part by a navigation device or other mobile device, and in part by a server.

In embodiments, the data representative of the multi-modal network may be stored as digital map data, incorporating the traversal time data. A device performing the method may then access the data in order to implement the steps of the present invention. The data may be stored by the device, or may be stored remotely from the device, permitting access by the device.

It is believed that the use of the traversal time data of the form described herein, including an additional frequency based component for segments of a sub-network of a multi-modal network which may be joined, left and traveled through by a user only at specific times, is advantageous in its own right. The invention extends to a data product storing such data, and to methods of creating such a data product.

In accordance with a further aspect the present invention provides a data product storing digital map data representing a multi-modal transportation network using a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multi-modal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs.

In accordance with a further aspect the present invention provides a method of creating a data product storing digital map data representing a multi-modal transportation network, the method comprising representing the multi-modal transportation network using a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multi-modal transportation network, the second transportation sub-network being a network which may be joined, left and traveled through by a user freely at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs.

The data product may further comprises data indicative of one or more point at which interchange is possible between the first and second transportation sub-networks, wherein each interchange point corresponds to a node of the multi-modal transportation network at which there is at least one incoming or outgoing segment of the first transportation sub-network and at least one incoming or outgoing segment of the second transportation sub-network.

The data product in any of these further aspects or embodiments of the invention, may be of any suitable form. In some embodiments the data product may be stored on a computer readable medium. The computer readable medium may be, for example, a diskette, CD ROM, ROM, RAM, flash memory or hard disk. The present invention extends to a computer readable medium comprising the data product in accordance with the invention of any of its aspects or embodiments.

It will be appreciated that the methods in accordance with the present invention in any of its aspects or embodiments may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the invention will now be described by way of example only, and with reference to the accompanying drawings of which.

DETAILED DESCRIPTION OF THE PREFERRED EMBODIMENTS

The invention will be described by reference to a multi-modal transportation network which includes a first sub-network, in the form of a public transport network, and a second sub-network, in the form of a road network for use by users travelling in private vehicles, e.g. cars. The public transport network will be exemplified as being a train network, although it will be appreciated that the invention is applicable to any type of public transport, permitting travel by one or more modes. Times of joining, leaving and travelling through the first sub-network are constrained by scheduled services through the network. In contrast, a user is substantially free to join, leave or travel through the road network whenever they choose. It will be appreciated that the techniques of the present invention may equally be applied to other examples of sub-networks of a multi-modal transportation network, including a first sub-network where times of joining, leaving and travelling through the network are constrained to specific times, and a second sub-network where such times are not constrained, with the user able to freely travel through the network. The steps of a method in accordance with the invention for obtaining a multi-modal route through the multi-modal transportation network will now be described by reference to FIG. 1.

Figure 1:
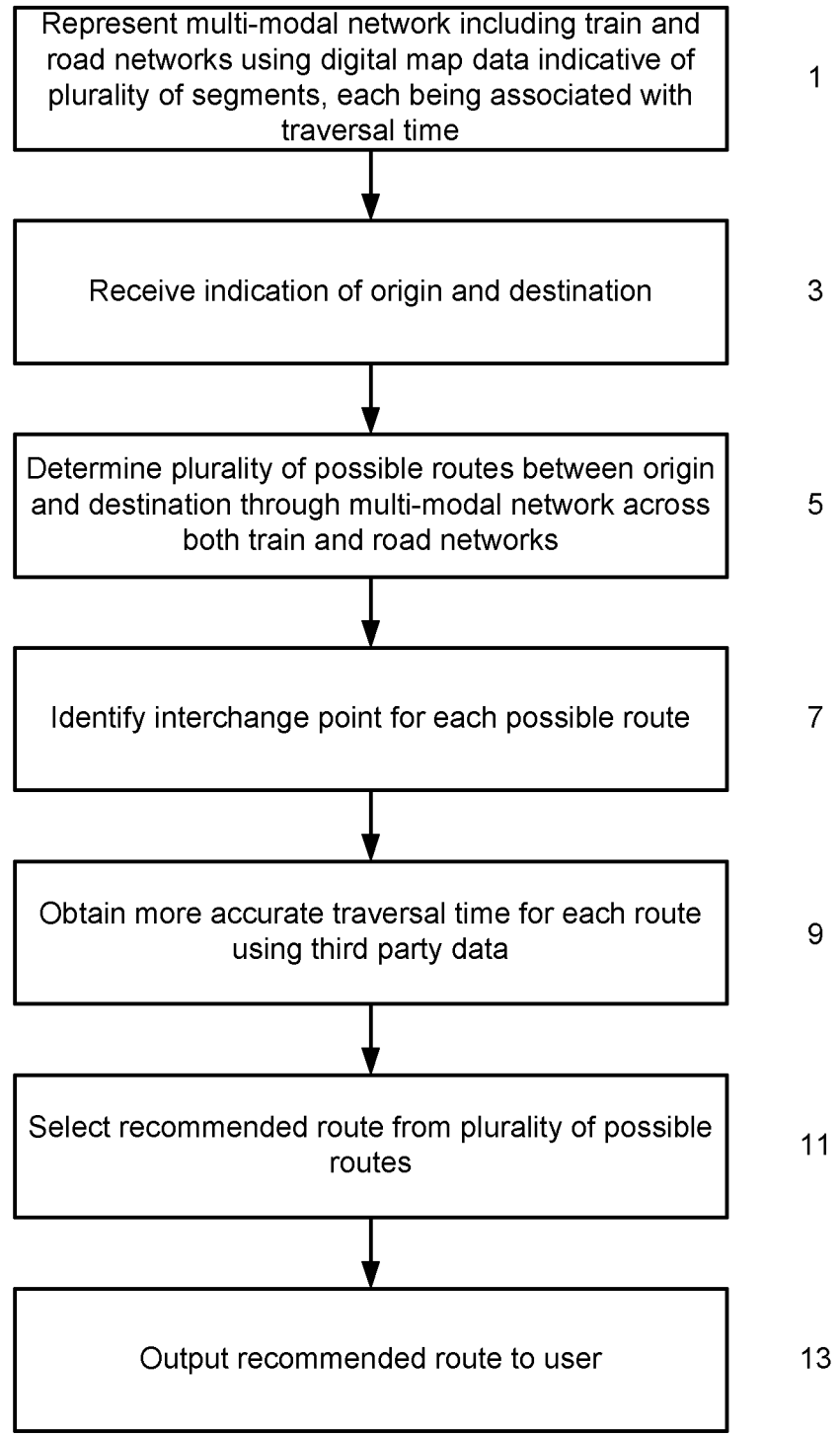
FIG. 1 is a flow chart illustrating the steps of a method for performing routing in a multi-modal transportation network in accordance with one embodiments of the invention.

In accordance with step 1 of FIG. 1, the multi-modal transportation network is represented by digital map data indicative of a plurality of segments, being indicative of segments of the network. The segments represent real-life segments of the network extending between nodes of the network. Each segment is associated with data indicative of the sub-network to which it belongs, i.e. the train network or the road network, and is also associated with traversal time data.

It will be appreciated that the steps of the method may be carried out by a server, or a mobile device, e.g. a navigation device, or may be carried out by a device having route planning functionality, but not necessarily having navigation functionality, such as a route planner implemented via any type of device. The steps of the method may be carried out by a combination of different devices. The device that performs the method has access to the data indicative of the plurality of segments making up the multi-modal network, and may store such data.

The traversal time data associated with the segments of the road network is indicative of a transit time for travelling along the respective segments from one end to the other. Such traversal time data is commonly provided as part of the digital map data used for route planning processes. The traversal time for a segment is indicative of the expected time to traverse the segment. The traversal time data may be time dependent. For example, each segment may be associated with a set of traversal times applicable to different timeslots, e.g. at different times of day, and day of the week. In some arrangements traversal time data is provided in respect of 10 minute timeslots throughout the day, for each day of the week.

The traversal time data associated with some of the segments of the train network is based on data indicative of an approximate transit time for the segment and an additional time based on a frequency that travel is possible along the segment. The segments having this type of traversal time data are those segments of the train network extending from interchange points with the road network. An interchange point with the road network corresponds to a node of the train network, where there is also an incoming or outgoing segment of the road network. Such an interchange point may be a station of the train network. The approximate transit time is indicative of the approximate time to travel from one end of the segment to the other. It has been found that this transit time need not be precise. While transit times may vary to a degree throughout the day, e.g. due to services which may be relatively faster or slower, it has been found that it is sufficient to use an approximation of the transit time for the purposes of the present invention. Likewise, the additional time based upon frequency may be based on an approximation of a service frequency. This enables initial routing to be carried out without needing to refer to a specific schedule of services along the segment, e.g. a third party schedule. The additional time based upon frequency is indicative of an expected waiting time for a service along the segment when changing to the train network from the road network. For example, where the service frequency is 5 times per hour, the interval between trains will be 12 minutes. An expected waiting time may be obtained using this interval. In one simple case, the expected waiting time may be provided by halving the interval between trains, giving, in this example, an expected waiting time of 6 minutes. This reflects that the waiting time will vary between approximately zero minutes and 12 minutes, depending upon a time of arrival at the interchange point relative to the time of departure of the previous service. Of course, more complex techniques may be used to obtain an expected waiting time based upon the frequency of service. It will be seen that the additional frequency based component of the traversal time, i.e. the expected waiting time acts as a time penalty, such that segments associated with longer waiting times will have a higher overall traversal time associated with them (for the same transit time). This acts as a penalty making the segments less favourable (to an extent depending upon the amount of waiting time) when routing is performed through the network as described below.

Other segments of the train network, which are not associated with interchange points, may be associated with a traversal time based only upon transit time, in a similar manner to the segments of the road network. The traversal time based upon transit time may be based upon an approximation of the transit time in the manner already described in relation to those segments that have a traversal time based upon both transit time and an additional frequency based time.

In step 3 of the method, an indication of a origin and a destination in the multi-modal network is received. The origin and/or the destination may be specified by a user. However, in other arrangements it is envisaged that one or both of the origin and destination may be inferred by a user, e.g. by consideration of the current position of a user, and routes typically traveled by a user at the relevant time of day.

In step 5, a set of a plurality of possible routes between the origin and destination through the multi-modal network across both the train and road networks is determined. The number of routes generated may be chosen as desired. However, the number of routes should be limited, being a shortlist of routes. This minimises the amount of subsequent processing required to obtain a recommended route. For example, from 2 to 5 routes may be generated. The routes are generated using a routing algorithm that takes into account traversal time for the segments of the network, and preferably acts to minimise the total travel time for a route between the origin and the destination. Although some segments are associated with a traversal time based upon both a transit time and an additional frequency based time, and other segments are associated with a traversal time based only upon transit time, both segments will appear the same to the routing algorithm, which is concerned only with the overall traversal time associated with a segment. This enables segments of the train network and the road network to be treated alike, such that the routing algorithm may generate a route taking into account traversal time through the multi-modal network as a whole. It is not necessary to use different routing algorithms for the train and road networks. The routes are generated by assigning each segment considered a cost based upon traversal time. Higher traversal times will be associated with higher costs. In this way, a least cost route (and, if desired one or more next least cost routes) may be identified between the origin and destination, which will correspond to the fastest route, and a given number of next fastest routes. Obtaining the set of possible routes may therefore be carried out in the same way as when obtaining routes through a road network in a conventional manner.

In preferred embodiments at least, the route search to obtain the set of possible routes takes into account one or more user preferences regarding interchange points. Each multi-modal route obtained will include an interchange point between the road and train networks. A user may specify that they only wish to see routes in which the interchange point meets one or more criteria, such as proximity to the home of the user, the origin or destination, and/or that it has parking provision. The route search will then take into account this preference, such that only routes having interchange points meeting the criteria are considered. Two exemplary routes are shown in FIGS. 6 and 7.

Figure 6:
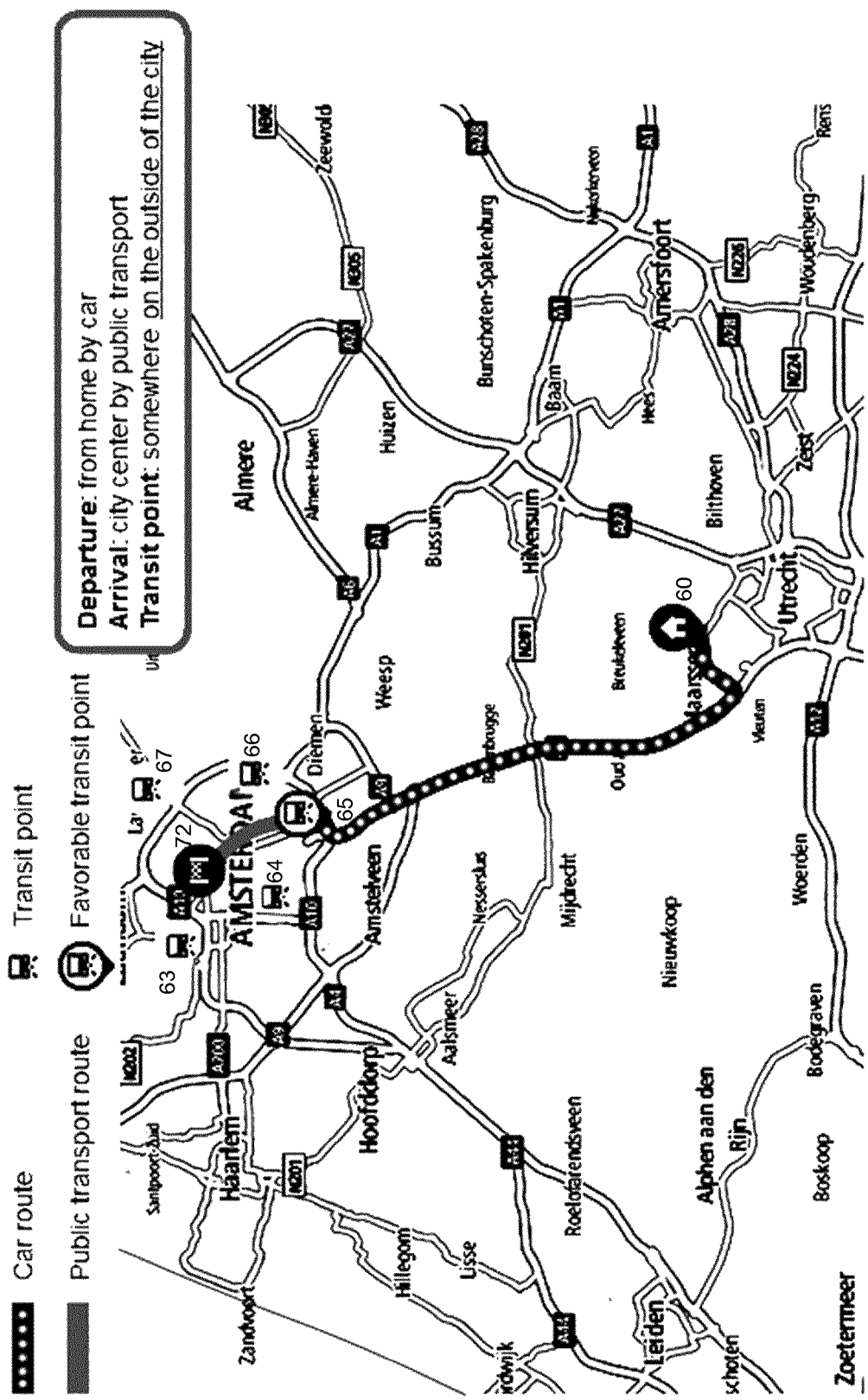
FIG. 6 illustrates an exemplary multi-modal route through the multi-modal transportation network, wherein the user is looking to depart from their home by car, and to arrive in the city centre by public transport using a transit point that is close to their home.
Figure 7:
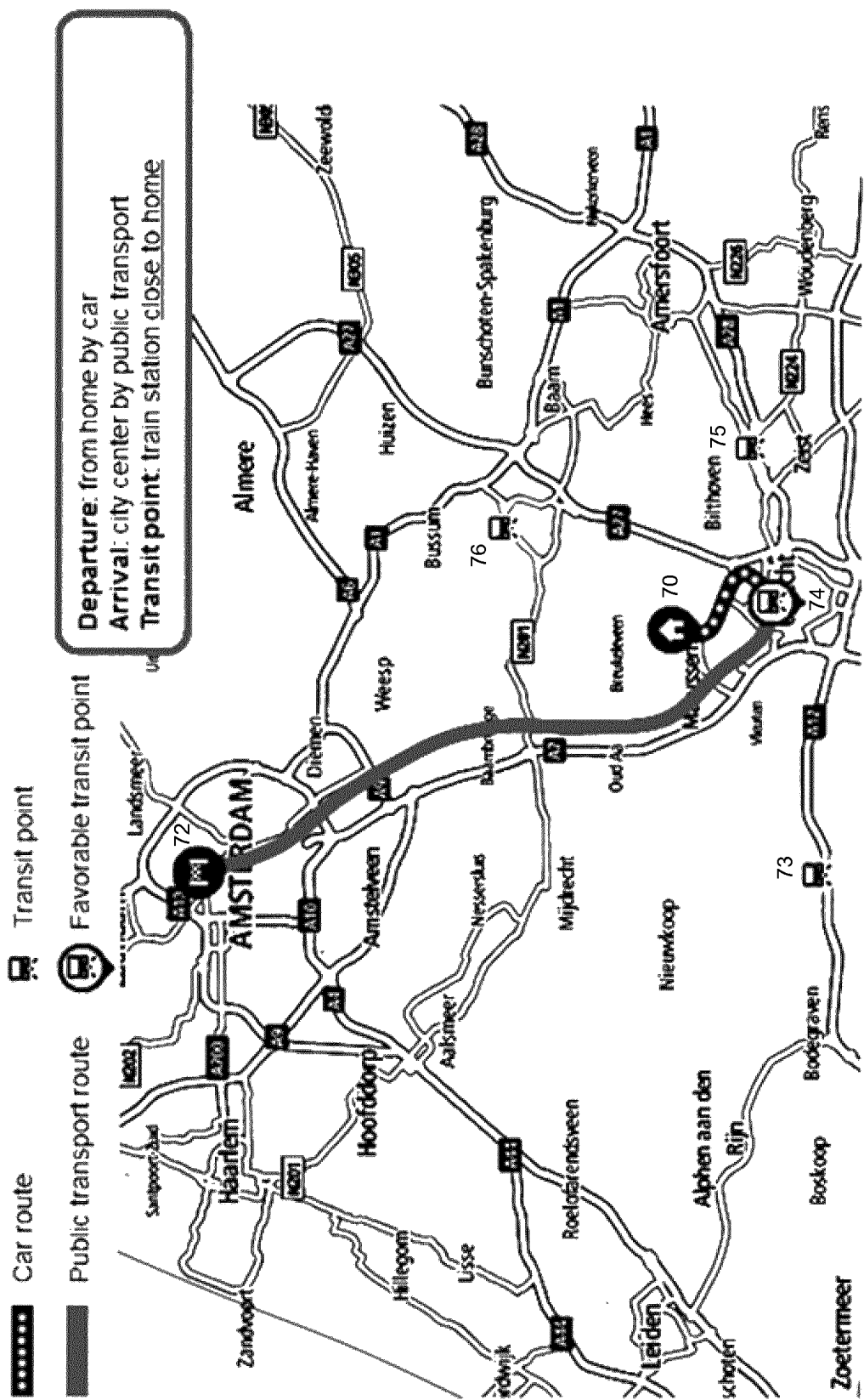
FIG. 7 illustrates another exemplary multi-modal route through the multi-modal transportation network, wherein the user is looking to depart from their home by car, and to arrive in the city centre by public transport using a transit point that is on the outskirts of the city (i.e. close to the destination).

In FIG. 6, the user is looking to depart from their home 60 by car, and to arrive in the city centre 62 by public transport using a transit point 63, 64, 65, 66, 67 that is on the outskirts of the city (thereby avoiding the need for the user to travel into the city centre by car). The fastest multi-modal route in FIG. 6 being via transit point 65.

In FIG. 7, the user is again looking to depart from their home 70, and to arrive in the city centre 72 by public transport using a transit point 73, 74, 75, 76 that is close to their home. The fastest multi-modal route in FIG. 7 being via transit point 74.

In step 7 an interchange point is identified for each of the possible routes, being the point at which there is a transition between the train and road networks. For ease of explanation, we will refer to the case in which the origin is in the road network, and the destination in the train network, such that the transition is from the road network to the train network. This would be the case, for example, where a user wishes to travel from home to the city centre to work, driving to a suitable station, i.e. interchange point, and parking there before taking the train the remainder of the route to the city centre. Each route is made up of a first portion from the origin through the road network to the interchange point, and a second portion from the interchange point through the train network to the destination. While the transit time for the first portion of the route through the road network may be reasonably accurate, based upon traversal time data in the digital map data which is typically used for routing purposes, the transit time used in providing the traversal times for the segments of the train network, and where applicable the frequency for providing the additional time penalty, were based upon approximate values.

In step 9, a more accurate traversal time is obtained for each possible route. This is achieved by obtaining a more accurate traversal time for the second portion of the route by interrogating schedule data for the train network, e.g. third party route planner data, using the interchange point, and an estimated time of arrival at the interchange point (known from planning of the first portion of the route through the road network). This may enable an appropriate service for the second portion of the route to be identified, and more detailed itinerary information, and an estimated time of arrival at the destination to be obtained. Obtaining more accurate data in relation to the second portion of the route (and hence timing information for the route as a whole) in this way, by reference to accurate schedule data, is only an optional feature. Where more accurate traversal times for the possible routes are obtained in this way, a fastest route based upon the more accurate timings may be identified, and used as a recommended route. It is envisaged that if the more accurate traversal time for a possible route is significantly different to that which had been estimated using the approximate traversal time data, e.g. if the difference exceeds a particular threshold, the route may be disregarded. The route generation process of step 5 may be repeated, this time constrained to avoid the particular route.

In step 11, a recommended route is selected from the plurality of possible routes. This may be done in a number of ways. The route may be the fastest route established using the approximate traversal time data, or, in embodiments in which a more accurate traversal time is obtained for the route, the fastest route as determined based on the more accurate traversal time data.

In step 13 the recommended route is output to a user. A set of navigation instructions is obtained for the first portion of the route through the road network, which may be output to the user via a navigation device associated with the user's car. Once the user reaches the interchange point, the destination may be provided to a third party route planning application, to enable guidance for the portion of the route through the train network to be provided to a user via a mobile device app provided by the third party user.

In embodiments, the route being followed and/or the set of navigation instructions can be obtained by, or shared between, two or more navigation devices; one navigation device may be embedded in a vehicle, and another navigation device may be a mobile device (and thus can be used when travelling on the public transportation network).

Some of the steps of this method will now be illustrated in more detail by reference to FIGS. 2 to 5.

Figure 2:
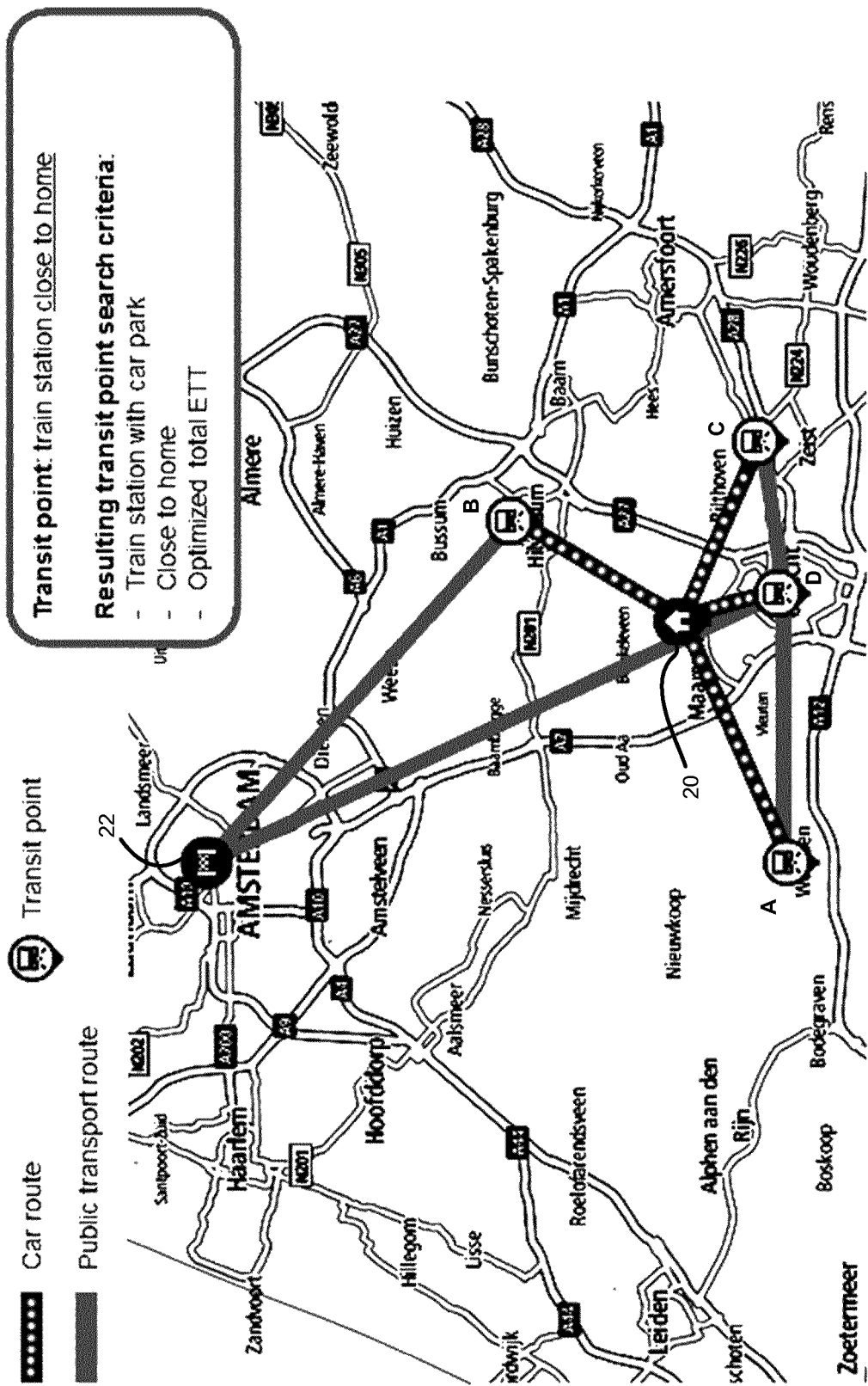
FIG. 2 indicates possible multi-modal routes between an origin and destination in the multi-modal transportation network, and the interchange points between the sub-networks associated with the routes.

FIG. 2 illustrates the multi-modal transportation network comprising the first and second networks (i.e. the train and road networks) in an area of interest. FIG. 2 illustrates a number of possible routes that have been identified between an origin 20 (in this case the user's home), and the destination 22, in central Amsterdam. These routes are the result of the initial route generation process described in step 5 of FIG. 1. Each route includes a first portion through the road network from the origin to an interchange point, i.e. station, and a second portion from the interchange point to the destination. In this example the user has specified that they are interested in routes associated with interchange points that are within a predetermined distance of their home, and have a car park.

Figure 3:
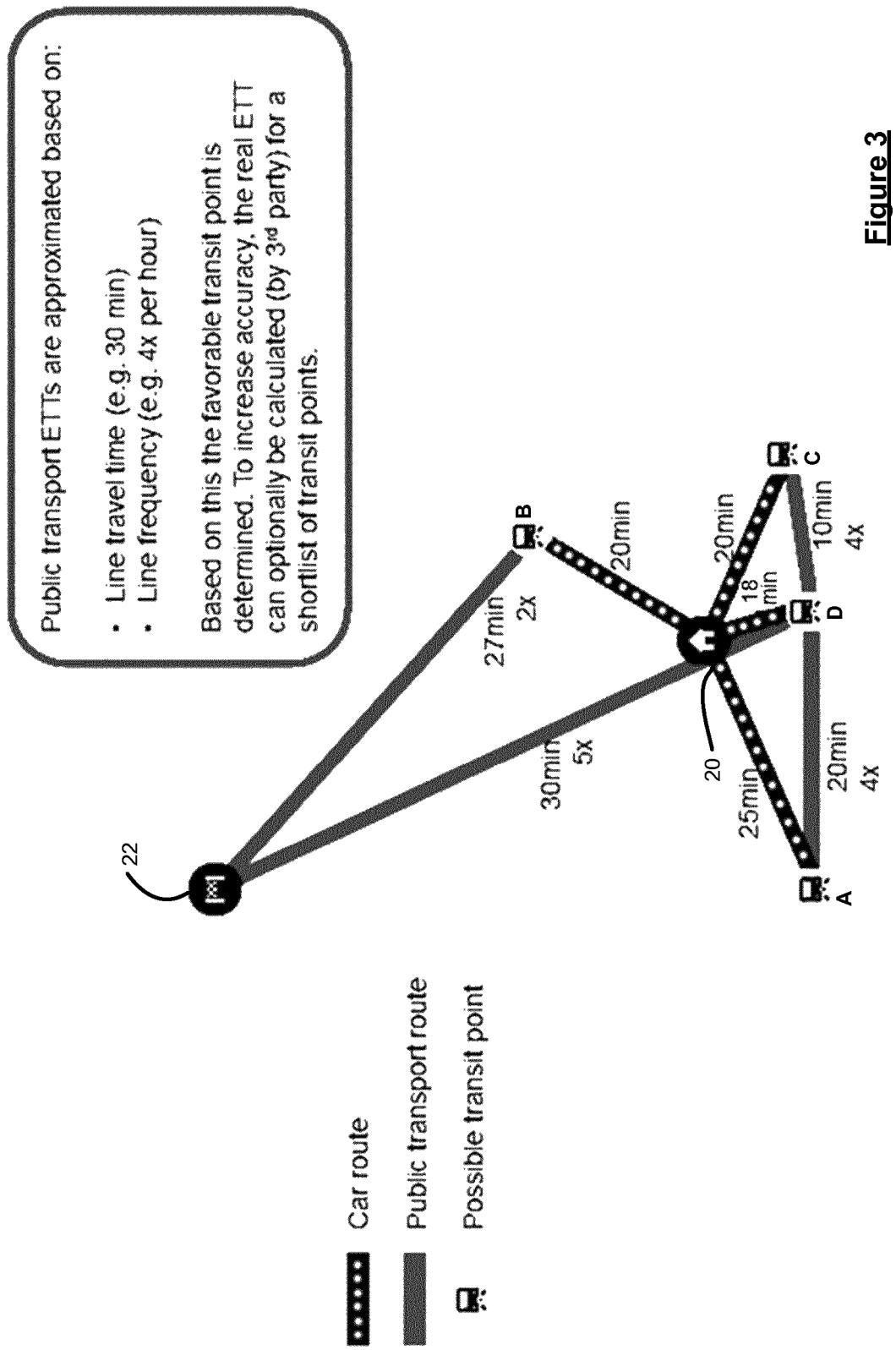
FIG. 3 illustrates the traversal time data associated with the routes indicated in FIG. 2.

FIG. 3 illustrates the possible routes in more detail. This figure illustrates the way in which traversal time data is obtained and associated with the segments of each of the train and road networks which were used in generating the possible routes. The traversal times along the road segments, i.e. from the origin 20 to interchange points A, B, C and D are illustrated, being 25 minutes, 20 minutes, 20 minutes and 18 minutes respectively. These are the transit times associated with the segments of the road network forming part of the first portion of the route according to the digital map data describing the network. If the portion of the route included multiple road segments, the transit time for each would simply be summed to provide an overall traversal time for this portion of the route. Each of the segments of the train network is annotated with a transit time, e.g., for the segment from B to the destination 22 being 27 minutes, and a frequency of 2×, i.e. twice an hour. These are typically approximate values for the transit time to travel along the segment, and the frequency of the service per hour along the segment respectively. Each of these segments of the train network, which extend from an interchange point, is associated with data indicative of a traversal time based on the transit time and also an expected waiting time, based on the frequency of service.

Figure 4:
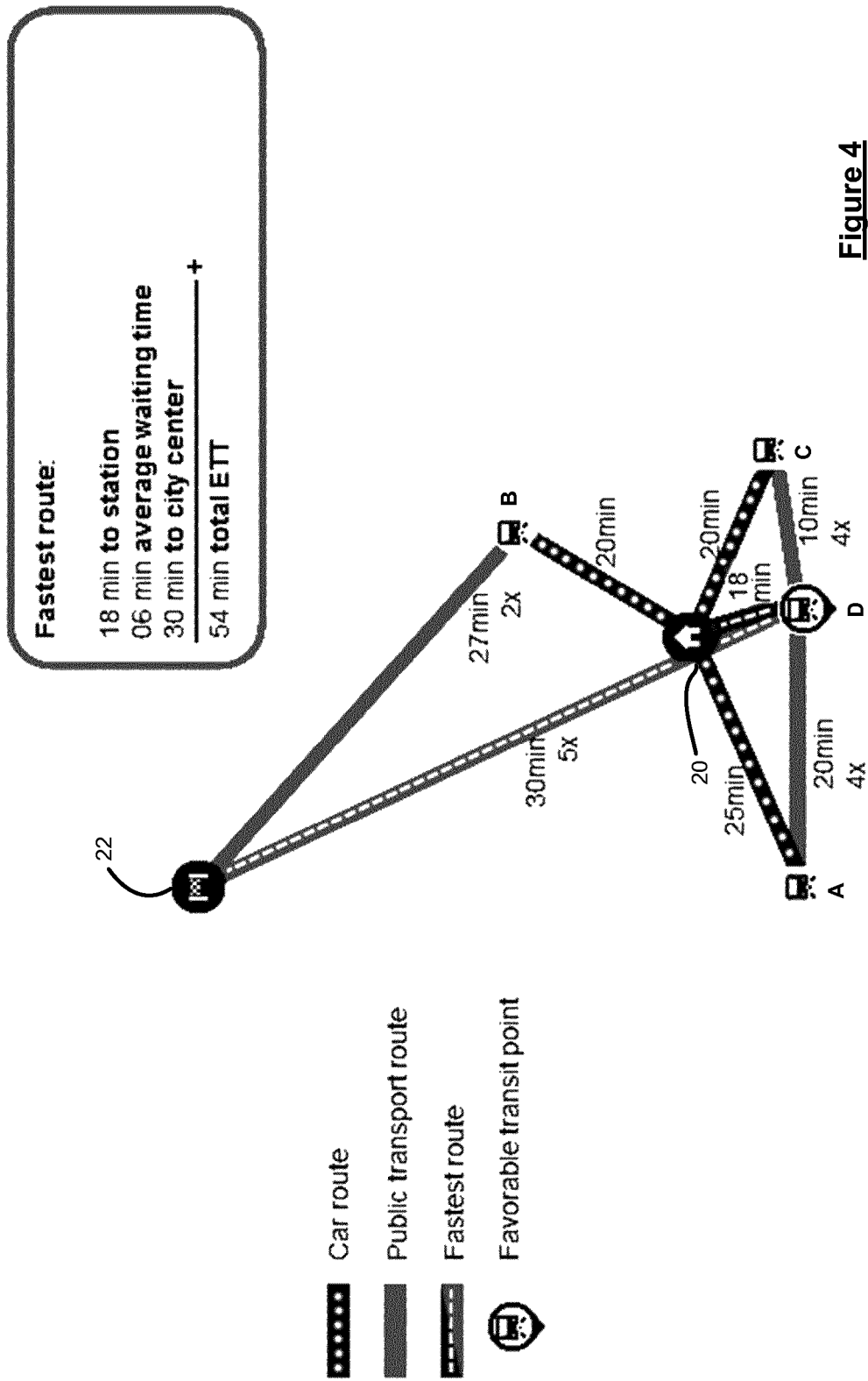
FIG. 4 indicates the fastest route of the possible routes of FIG. 3 determined using the traversal time data.

FIG. 4 illustrates the fastest of the possible routes of FIG. 3. As can be seen, the fastest of the possible routes based on this approximate traversal time data is the route via interchange station D. The transit time from home to the station via the road network is 18 minutes. The approximate transit time by train to the destination is then 30 minutes. As the frequency of this route is 5 times an hour, the approximate expected waiting time is calculated to be 6 minutes. This gives a total estimated traversal time of 54 minutes. Of course, where more than one segment of the train network is included in a route, the traversal times for each segment may be summed in obtaining an overall traversal time. The traversal times will be based upon transit time and not an expected waiting time for subsequent segments along the route, not associated with the interchange point.

Figure 5:
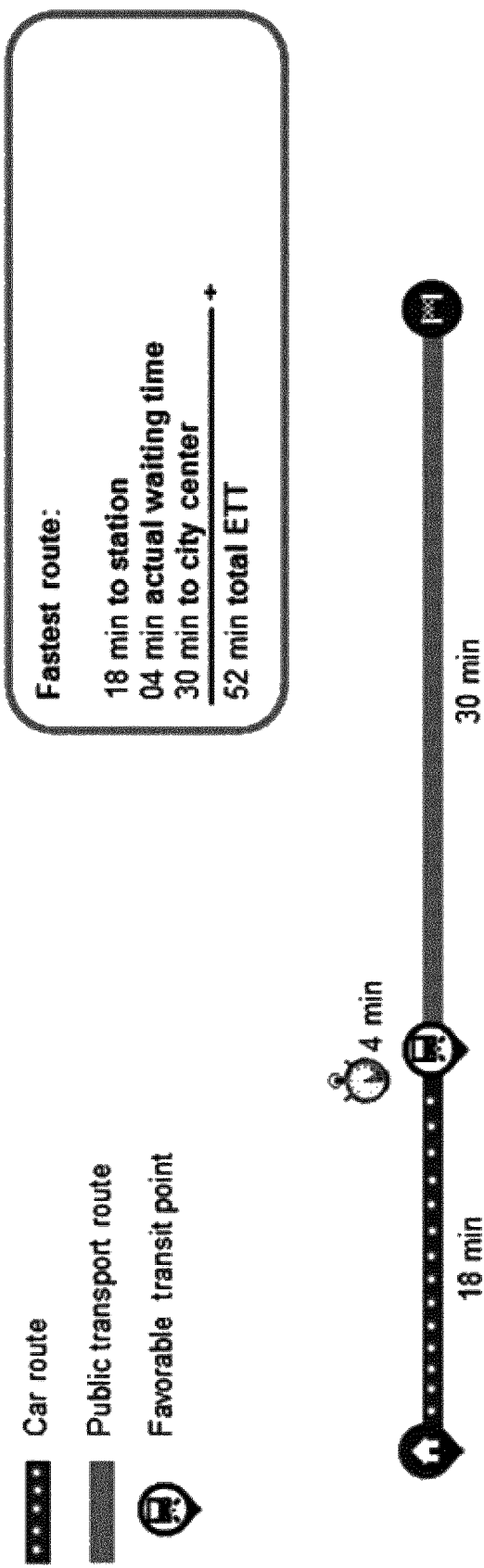
FIG. 5 illustrates a more accurate traversal time for the determined fastest route based on accurate schedule data, e.g. from the use of a third party route planner.

As discussed above, the estimated travel time based upon the traversal time associated with the segments is only approximate. FIG. 5 illustrates the result of interrogating a third party route planner using the interchange station D to determine a more accurate traversal time for the applicable departure time. The transit time for the car part of the route remains at 18 minutes. However, the actual waiting time has been found to be 4 minutes rather than the estimated 6 minutes. The transit time for the train journey remains at 30 minutes, giving a total traversal time for the route of 52 minutes, rather than the estimated 54 minutes. As this is not significantly different, and, indeed, is slightly quicker than the estimate, this route may be taken as the recommended route.

Navigation instructions may be provided to a driver via an in-car navigation device for the part of the route from the origin to the interchange point, or a car park associated with it. If required, navigation instructions may be provided to guide the user in walking from the car park to the station. The destination may be provided to a third party route planning application (or 'app') for the train network when the user reaches the interchange station to enable guidance to be provided for the portion of the journey through the public transport train network.

FIG. 6 illustrates another scenario in which the present invention may be useful. Here a recommended route from an origin 60 to a destination 62 in the city centre is shown, via an interchange station 65 on the outskirts of the town. This route might be obtained as a result of a route search in which a user has specified that they are interested in an interchange point that is within a predetermined distance of the destination. The first portion of this route from the origin to the interchange station is via the road network, with the continuation from the interchange station being via the train network. A number of other potential interchange stations 63, 64, 66 and 67 are also shown. The recommended route has been selected from among a number of possible multi-modal routes from the origin to the destination via each of these alternative interchange stations in the manner described in relation to FIGS. 1 to 5.

Of course, the principles of the invention may equally be applied to situations in which the first portion of a journey from an origin is through the public transport network, with a subsequent interchange to the road network for a continuation of the journey to the destination, or to more complex multi-modal routes involving more than one interchange between modes of transport.

It will be seen that in accordance with certain aspects and embodiments of the invention, using transit point and transit point connectivity data, a determination is made of a favourable transit point to change from the car to public transportation, together with an approximate estimated travel time to the final destination. The transit point and destination are passed to a third party public transport route planner to determine the exact public transport route. The result is combined with the driving route to determine the total estimated travel time.

In order to perform multi-modal routing, e.g. a combination of car routing on the road network and public transportation (PT) routing, it is necessary to select an optimal transfer point from one mode of transport, e.g. car, to another mode of transport, e.g. public transportation. The selection of such a transfer point requires optimal routing to be performed for all modes of transport involved.

Car routing and PT routing algorithms, however, typically differ mathematically, thereby leading to complications in creating a truly multi-model route planner.

Thus, at least in embodiments of the present invention, cost values are determined and assigned to legs of the PT network, such that the PT network can be explored mathematically in the same manner as the road network. For example, line frequencies on the PT network can be used to compute expected wait and transfer times. With these computed times, it is possible to assign all legs in the PT network a travel time value. The travel time value can, in some embodiments, be time dependent.

An optimal route can then be calculated to the final destination using the PT network, resulting in a transfer point, an "approximate" itinerary for the PT part of the journey, and an approximate estimated travel time (ETT). As will be appreciated, the itinerary will not at this stage include actual arrival and departure times for the PT network.

The computed transfer point from one mode of transport to another, in case from car to PT, and the final destination can then be used to query a third party for an "actual" PT itinerary.

Optionally, a check can be performed to determine if the travel time of the actual PT itinerary is roughly the same as the approximate PT itinerary determined in the routing calculation. Should the difference between the two itineraries be greater than a predetermined threshold, e.g. the actual itinerary is substantially longer than the approximate itinerary, then the routing calculation be performed again but with the previously selected transfer point being prohibited from selection.

Once the route has been determined, a navigation device within a vehicle can be used to guide the user from their home to the selected transit point using the road network. Once at the transit point, the user can access the PT itinerary from the trip on a mobile device, such as a smartphone.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Lastly, it should be noted that whilst the accompanying claims set out particular combinations of features described herein, the scope of the present invention is not limited to the particular combinations hereafter claims, but instead extends to encompass any combination of features or embodiments herein disclosed irrespective of whether or not that particular combination has been specifically enumerated in the accompanying claims at this time.

The invention claimed is:

1. A method of obtaining multi-modal routes in a multi-modal transportation network represented using a plurality of segments, each of the plurality of segments being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multimodal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs, the method comprising:
performing a route search between an origin and a destination within the multi-modal transportation network using the traversal time data associated with the segments of the network including the first subset of segments and the second subset of segments in order to obtain one or more possible multi-modal routes from the origin to the destination through the transportation network;
selecting a selected multi-modal route from among the one or more possible multi-modal routes; and
presenting, to a user, navigation instructions for following the selected multi-modal route as the user travels along the selected multi-modal route, the navigation instructions being presented by a corresponding device based on a mode of transport presently being used by a user for traveling along the selected multi-modal route.

2. The method of claim 1, wherein the first transportation sub-network is a public transportation network and the second transportation sub-network is a private transportation network.

3. The method of claim 1, wherein at least some of the segments indicative of the first transportation sub-network are associated with a point of interchange with the second transportation subnetwork, the traversal time data associated with these segments including an additional time based on a frequency at which travel along the segment occurs.

4. The method of claim 1, wherein the additional time based upon frequency is inversely proportional to the frequency at which travel may occur along the segment.

5. The method of claim 1, wherein the step of performing a route search between an origin and a destination within the multi-modal transportation network using the traversal time data associated with the segments of the network in order to obtain one or more possible multi-modal route from the origin to the destination through the transportation network comprises determining a fastest route, and optionally one or more next fastest routes through the multi-modal network.

6. The method of claim 1, wherein the step of performing a route search takes into account one or more interchange point user preferences.

7. The method of claim 6, wherein the one or more preferences include a preference in relation to at least one of: a location of the interchange point and a property of the interchange point other than the location of the interchange point.

8. The method of claim 6, wherein the one or more preferences include a preference specifying that the interchange point is within a given distance of at least one of: the origin; the destination; and a home of the user.

9. The method of claim 6, wherein the one or more preferences include a preference specifying that the interchange point has parking provision.

10. The method of claim 1, comprising obtaining, for the one or more possible multi-modal routes, data indicative of an interchange point along the route at which there is a change between the first and second transportation sub-networks.

11. The method of claim 1, comprising obtaining more accurate traversal time data for at least the portion of the one or more possible multi-modal routes which extend through the first transportation sub-network.

12. The method of claim 11, wherein the more accurate traversal time data is obtained using data indicative of a schedule for the first transportation sub-network.

13. The method of claim 1, wherein a plurality of possible routes are obtained, the method further comprising selecting a subset of one or more of the possible routes for recommendation to a user.

14. The method of claim 1, further comprising outputting data indicative of at least one of the one or more possible multi-modal routes to a user.

15. The method of claim 14, wherein data is output in respect of a recommended route selected from a plurality of possible multi-modal routes.

16. A system arranged to obtain multi-modal routes in a multi-modal transportation network, comprising:
a data store comprising data indicative of a plurality of segments, each being indicative of a navigable segment of the network, and each segment having data indicative of a traversal time for the segment associated therewith, wherein the plurality of segments representative of the multi-modal transportation network includes: a first subset of segments indicative of a first transportation sub-network of the multi-modal transportation network, the first transportation sub-network being a network which may be joined, left and traveled through by a user only at specific times; and a second subset of segments indicative of a second transportation sub-network of the multimodal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs; and
a processor arranged to:
perform a route search between an origin and a destination within the multi-modal transportation network using the traversal time data associated with the segments of the network including the first subset of segments and the second subset of segments in order to obtain one or more possible multi-modal route from the origin to the destination through the transportation network;
select a selected multi-modal route from among the one or more possible multi-modal routes; and
present, to a user, navigation instructions for following the selected multi-modal route as the user travels along the selected multi-modal route, the navigation instructions being presented by a corresponding device based on a mode of transport presently being used by a user for traveling along the selected multi-modal route.

17. A method of creating a data product storing digital map data representing a multi-modal transportation network, the method comprising:
generating digital map data representing the multi-modal transportation network using a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multimodal transportation network, the second transportation sub-network being a network which may be joined, left and traveled through by a user freely at substantially any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs; and storing the digital map data including the first subset of segments and the second subset of segments on the data product, the storing comprising storing, associated with the at least some of the first subset of segments, the additional time based on the frequency at which travel along the segment occurs.

18. The method of claim 17, wherein the data product further comprises data indicative of one or more point at which interchange is possible between the first and second transportation sub-networks, wherein each interchange point corresponds to a node of the multi-modal transportation network at which there is at least one incoming or outgoing segment of the first transportation sub-network and at least one incoming or outgoing segment of the second transportation sub-network.

19. A non-transitory computer readable medium comprising instructions which, when executed by at least one processor of a computing device, cause the computing device to perform a method of obtaining multi-modal routes in a multi-modal transportation network represented using a plurality of segments, each of the plurality of segments being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multimodal transportation network, the second transportation sub-network being a network which may be joined, left and traveled through by a user substantially at any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs, the method comprising:

performing a route search between an origin and a destination within the multi-modal transportation network using the traversal time data associated with the segments of the network including the first subset of segments and the second subset of segments in order to obtain one or more possible multi-modal routes from the origin to the destination through the transportation network;

selecting a selected multi-modal route from among the one or more possible multi-modal routes; and presenting, to a user, navigation instructions for following the selected multi-modal route as the user travels along the selected multi-modal route, the navigation instructions being presented by a corresponding device based on a mode of transport presently being used by a user for traveling along the selected multi-modal route.

20. A non-transitory computer readable medium comprising instructions which, when executed by at least one processor of a computing device, cause the computing device to perform a method of creating a data product storing digital map data representing a multi-modal transportation network, the method comprising:

generating digital map data representing the multi-modal transportation network using a plurality of segments, each being indicative of a navigable segment of the network, and each segment having data indicative of a traversal time for the segment associated therewith, wherein the plurality of segments representative of the multi-modal transportation network includes:

a first subset of segments indicative of a first transportation sub-network of the multi-modal transportation network, the first transportation sub-network being a network which may be joined, left and traveled through by a user only at specific times; and a second subset of segments indicative of a second transportation sub-network of the multimodal transportation network, the second transportation sub-network being a network which may be joined, left and traveled through by a user freely at substantially any time, the traversal time data associated with at least some of the first subset of the plurality of segments indicative of navigable segments of the first transportation sub-network of the multi-modal transportation network being based on a transit time indicative of a time taken to travel along the segment, and an additional time based on a frequency at which travel along the segment occurs; and storing the digital map data including the first subset of segments and the second subset of segments on the data product, the storing comprising storing, associated with the at least some of the first subset of segments, the additional time based on the frequency at which travel along the segment occurs.

* * * * *